United States Patent
Shibata et al.

(10) Patent No.: US 10,267,644 B2
(45) Date of Patent: Apr. 23, 2019

(54) MAP DISPLAY DEVICE, COMPUTER READABLE STORAGE MEDIUM, AND MAP DISPLAY METHOD

(71) Applicant: CASIO COMPUTER CO., LTD., Shibuya-ku (JP)

(72) Inventors: Katsuyuki Shibata, Tachikawa (JP); Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/800,907

(22) Filed: Nov. 1, 2017

(65) Prior Publication Data

US 2018/0180436 A1 Jun. 28, 2018

(30) Foreign Application Priority Data

Dec. 28, 2016 (JP) ................. 2016-255568

(51) Int. Cl.
*G01C 21/00* (2006.01)
*G01C 21/36* (2006.01)
(Continued)

(52) U.S. Cl.
CPC ....... *G01C 21/367* (2013.01); *G01C 21/3676* (2013.01); *G06F 3/1423* (2013.01);
(Continued)

(58) Field of Classification Search
None
See application file for complete search history.

(56) References Cited

U.S. PATENT DOCUMENTS 7,715,981 B2 * 5/2010 Bradley ............. G01C 21/3682
340/995.18
8,428,865 B2 * 4/2013 Otsuki ............... G01C 21/3611
701/400
(Continued)

FOREIGN PATENT DOCUMENTS

JP 9-159481 6/1997
JP 10-333560 12/1998
(Continued)

OTHER PUBLICATIONS

Office Action dated Feb. 12, 2019 issued in Japanese Patent Application No. 2016255568.
CodeZine, "Yolp", 2016, 5 pages with partial translation.

*Primary Examiner* — Martin Mushambo
(74) *Attorney, Agent, or Firm* — Cozen O'Connor

(57) ABSTRACT

A map display device includes a display and a processor. The display displays a predetermined map information group including first map information in a first display mode correlated to a first area and second map information in a second display mode correlated to a second area. The processor conducts the functions of acquiring current position information. When a current position indicated by the current position information is included in the first area, the processor causes the display to perform a display of the first map information in the first display mode correlated to the first area without guiding a user to a destination. When the current position is included in the second area, the processor causes the display to perform a display of the second map information in the second display mode correlated to the second area without guiding the user to the destination.

19 Claims, 8 Drawing Sheets

(51) Int. Cl.
*G09G 5/377* (2006.01)
*G06F 3/14* (2006.01)
*H04B 1/3827* (2015.01)

(52) U.S. Cl.
CPC ........... *G06F 3/1454* (2013.01); *G09G 5/377* (2013.01); *G09G 2330/022* (2013.01); *G09G 2340/145* (2013.01); *G09G 2354/00* (2013.01); *G09G 2370/022* (2013.01); *H04B 1/3827* (2013.01)

(56) References Cited

U.S. PATENT DOCUMENTS

| | | | | |
|---|---|---|---|---|
| 9,069,793 | B2* | 6/2015 | Kadowaki | G06F 17/30241 |
| 2002/0173859 | A1* | 11/2002 | Kishigami | G01C 21/367 |
| | | | | 700/1 |
| 2007/0225905 | A1* | 9/2007 | Yamashita | G01C 21/30 |
| | | | | 701/457 |
| 2008/0177738 | A1* | 7/2008 | Ito | G06F 17/3087 |
| 2009/0150429 | A1* | 6/2009 | Yamamoto | G06F 17/30265 |
| 2011/0173572 | A1* | 7/2011 | van Zwol | G06N 7/005 |
| | | | | 715/856 |
| 2013/0044137 | A1* | 2/2013 | Forsblom | G09B 29/106 |
| | | | | 345/661 |
| 2013/0191783 | A1* | 7/2013 | Sugita | G06F 3/04842 |
| | | | | 715/810 |
| 2014/0055499 | A1* | 2/2014 | Horvitz | G01C 21/36 |
| | | | | 345/661 |
| 2016/0086568 | A1* | 3/2016 | Imamura | G06F 3/16 |
| | | | | 345/643 |
| 2017/0186399 | A1* | 6/2017 | Moritani | G04G 9/007 |

FOREIGN PATENT DOCUMENTS

| | | |
|---|---|---|
| JP | 2002-031535 | 1/2002 |
| JP | 2003-232640 | 8/2003 |
| JP | 2004-317385 | 11/2004 |
| JP | 2005-321351 | 11/2005 |
| JP | 2006-126278 | 5/2006 |
| JP | 2014-006054 | 1/2014 |

* cited by examiner

FIG.3
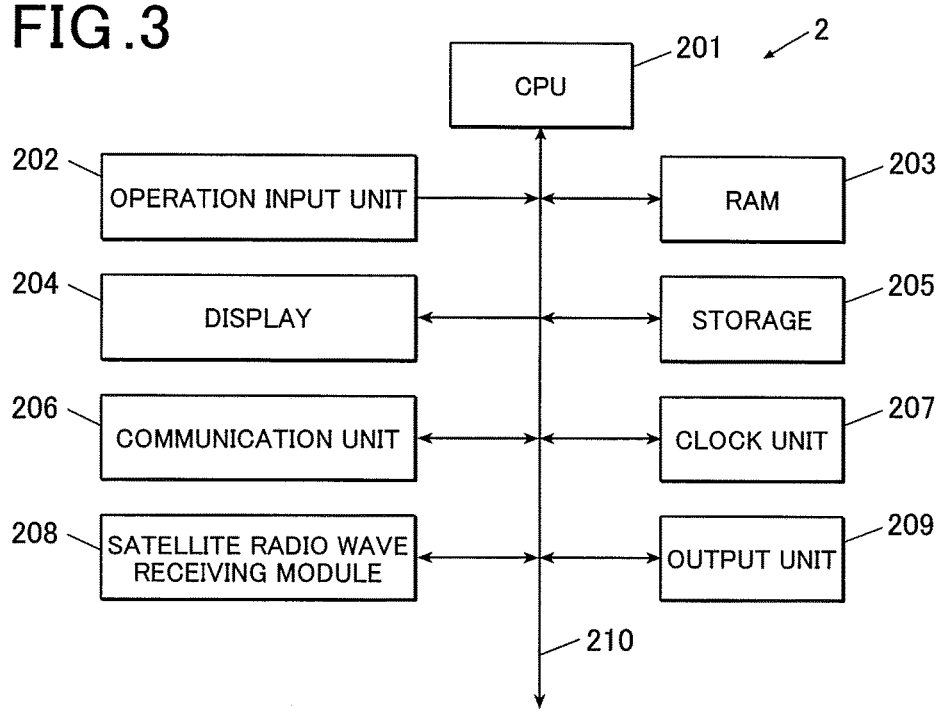
FIG.4A    FIG.4B    FIG.4C
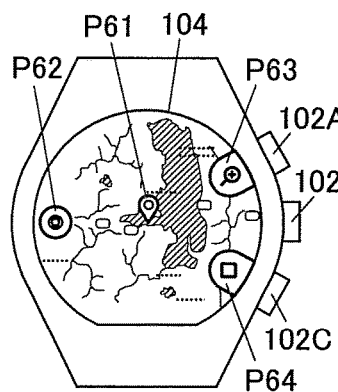 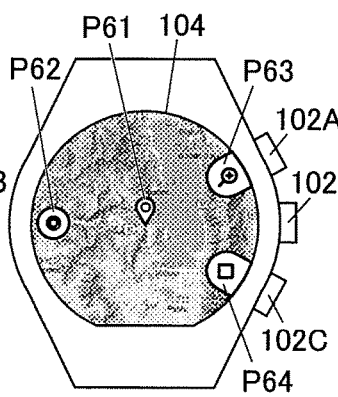 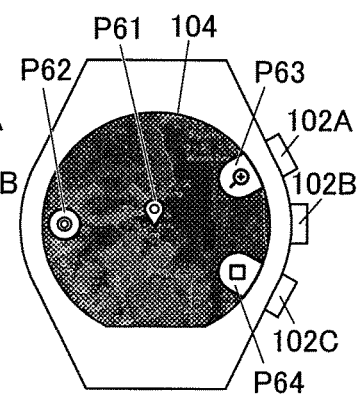

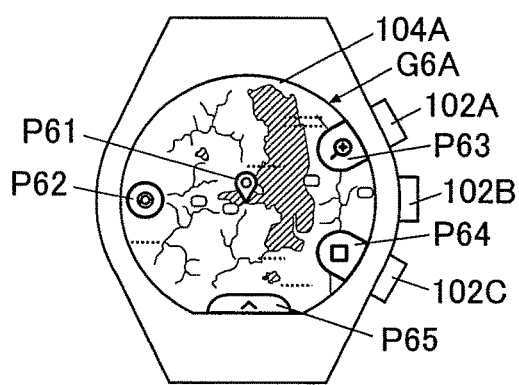
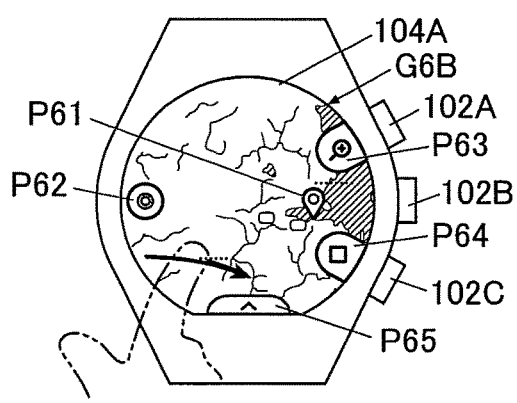
FIG.6A
FIG.6B

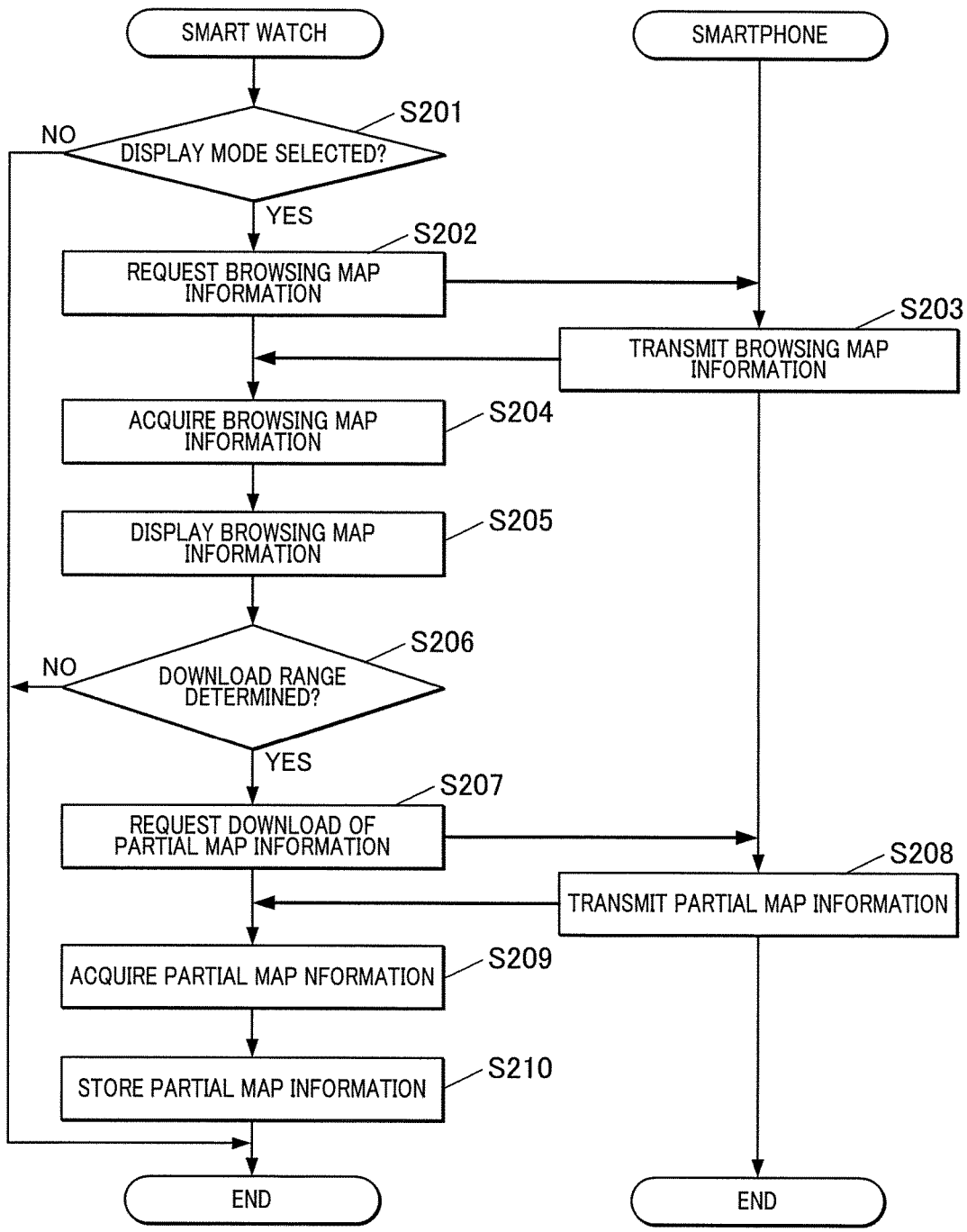

MAP DISPLAY DEVICE, COMPUTER READABLE STORAGE MEDIUM, AND MAP DISPLAY METHOD

CROSS-REFERENCE TO RELATED APPLICATIONS

This application is based upon and claims the benefit of priority under 35 USC 119 of Japanese Patent Application No. 2016-255568 filed on Dec. 28, 2016, the entire disclosure of which, including the description, claims, drawings, and abstract, is incorporated herein by reference in its entirety.

BACKGROUND OF THE INVENTION

Field of the Invention

The present invention relates to a map display device, a computer readable storage medium, and a map display method.

Description of the Related Art

Conventionally, various products, services, and the like using the position information and the map information have been provided for the portable (or wearable) electronic devices such as a mobile phone, a smartphone (highly functional mobile phone), a tablet terminal, a navigation terminal, and a sport watch.

In one of the techniques for the electronic devices as above, for example, when the distance between the current position and the registered destination has become a predetermined distance or less, the map information on the display is switched from the road map information mainly displaying the roads to the housing map information mainly displaying the houses (for example, see Japanese Patent Application Laid-Open Publication No. Hei 9-159481).

SUMMARY OF THE INVENTION

According to one aspect of the present invention, these is provided a map display device including: a display which displays a predetermined map information group including first map information in a first display mode correlated to a first area and second map information in a second display mode correlated to a second area; and a processor which conducts the functions of: acquiring current position information, and causing the display to perform a display of the first map information in the first display mode correlated to the first area without guiding a user to a destination when a current position indicated by the current position information is included in the first area, and causing the display to perform a display of the second map information in the second display mode correlated to the second area without guiding the user to the destination when the current position is included in the second area.

According to another aspect of the present invention, these is provided a computer readable storage medium storing a program executable by a computer, the program causing the computer which controls an apparatus equipped with a display displaying a predetermined map information group including first map information in a first display mode correlated to a first area and second map information in a second display mode correlated to a second area, to conduct the functions of: acquiring current position information, and causing the display to perform a display of the first map information in the first display mode correlated to the first area without guiding a user to a destination when a current position indicated by the current position information is included in the first area, and causing the display to perform a display of the second map information in the second display mode correlated to the second area without guiding the user to the destination when the current position is included in the second area.

According to another aspect of the present invention, these is provided a map display method including: acquiring current position information, and causing a display to perform a display of first map information in a first display mode correlated to a first area without guiding a user to a destination when a current position indicated by the current position information is included in the first area, and causing the display to perform a display of second map information in a second display mode correlated to a second area without guiding the user to the destination when the current position is included in the second area.

BRIEF DESCRIPTION OF THE SEVERAL VIEWS OF THE DRAWINGS

The following description with reference to the accompanying drawings can contribute to better understanding of the invention.

FIG. 3 is a block diagram illustrating a functional structure of a smartphone;

FIGS. 4A to 4C illustrate examples of the map information with various display modes;

FIGS. 6A and 6B illustrate examples of the screen displayed when the user browses the map information;

FIG. 7 is a flowchart illustrating one example of the map information storage processing according to the embodiment;

DETAILED DESCRIPTION OF THE PREFERRED EMBODIMENTS

Embodiments for carrying out the present invention will hereinafter be described with reference to the drawings. In the embodiment to be described below, various limitations which are preferable in the technical point of view for carrying out the present invention are added but the scope of the invention will not be limited to the embodiment and the illustrated examples below.

«Structure of Map Information Display System 100»

Figure 1:
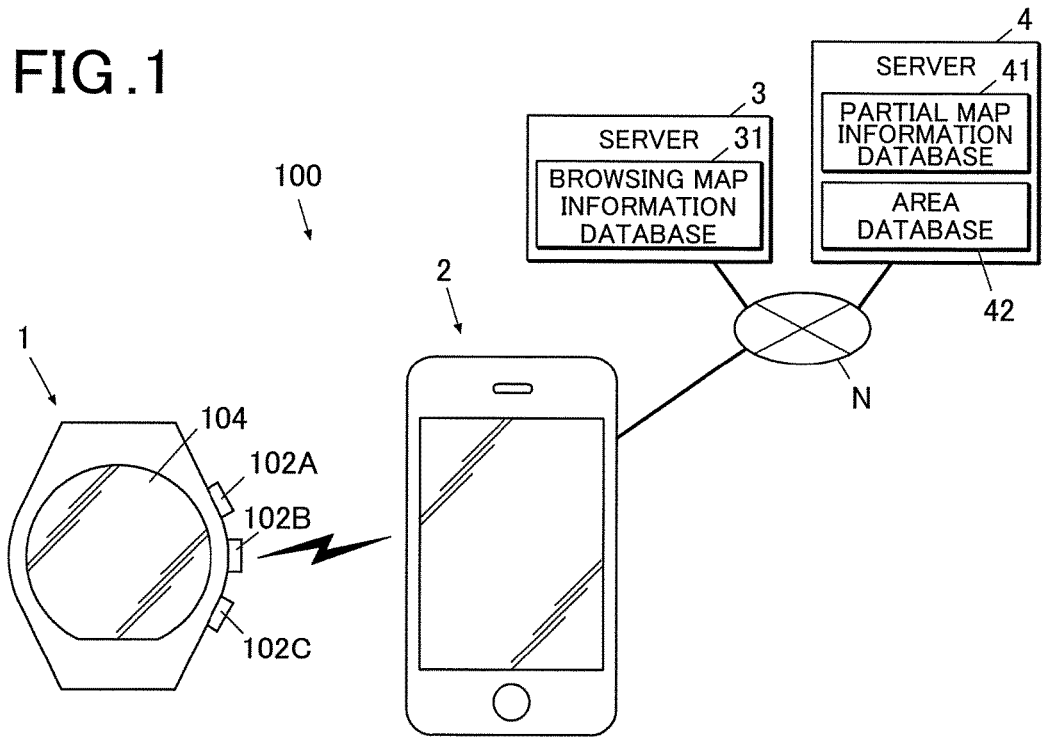
FIG. 1 is a schematic structure diagram illustrating a map information display system according to an embodiment.

First, with reference to FIG. 1, a structure of the present embodiment is described. FIG. 1 is a schematic structure diagram of a map information display system 100 according to the present embodiment.

The map information display system 100 according to the present embodiment is a system for displaying on a screen, map information in a display mode corresponding to a first area when the current position is included in the first area, and displaying on a screen, map information in a display mode corresponding to a second area when the current position is included in the second area. In addition, the map information display system 100 is a system for displaying on a screen, an arbitrary region of browsing map information by a user's manipulation, acquiring partial map information of a region corresponding to an entire region displayed in the screen as the map information different from the browsing map information, and storing the acquired partial map information.

As illustrated in FIG. 1, the map information display system 100 includes a smart watch (map display device) 1, a smartphone 2, a server 3, and a server 4. The smart watch 1 and the smartphone 2 are connected so that the communication is possible, and the smartphone 2, the server, 3 the server 4, and the like are connected through a communication network N so that the communication is possible.

Although the map information display system 100 includes the smartphone 2 in the present embodiment, the present invention is not limited to this structure. Instead of the smartphone 2 or in addition to the smartphone 2, for example, a user terminal such as a tablet terminal or a personal computer (PC), a server, or the like may be included in the map information display system 100.

«Structure of Smart Watch 1»

Figure 2:
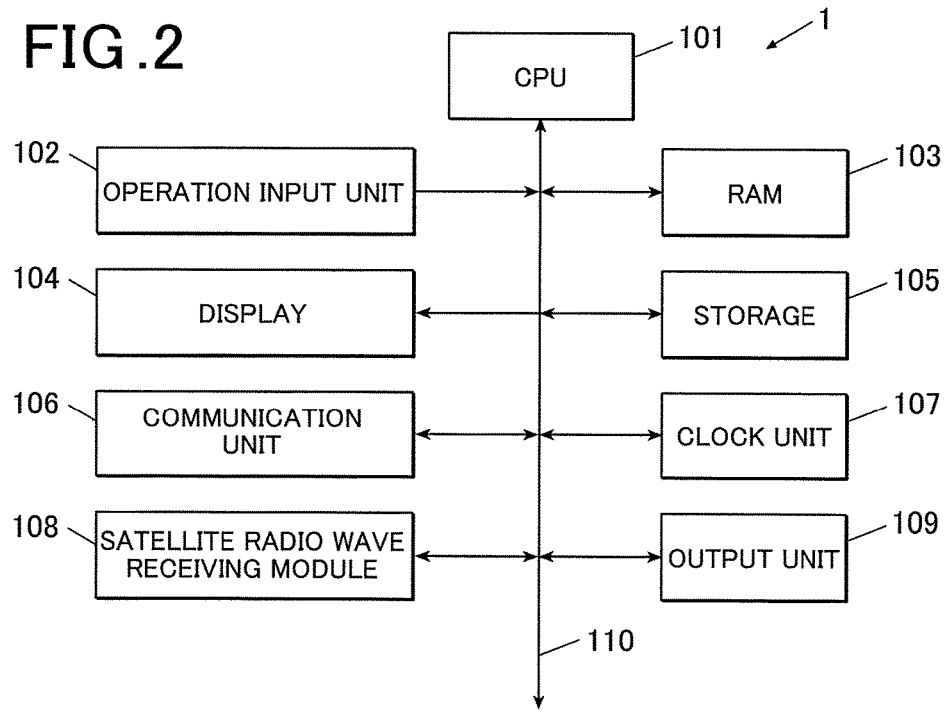
FIG. 2 is a block diagram illustrating a functional structure of a smart watch.

Next, the internal structure of the smart watch 1 is described. FIG. 2 illustrates the internal structure of the smart watch 1.

As illustrated in FIG. 2, the smart watch 1 includes a central processing unit (CPU) 101, an operation input unit 102, random access memory (RAM) 103, a display 104, a storage 105, a communication unit 106, a clock unit 107, a satellite radio wave receiving module 108, and an output unit 109. These units are connected through a bus 110.

The CPU 101 reads out a system program stored in the storage 105, loads the program into the work area of the RAM 103, and controls each unit in accordance with the system program. In addition, the CPU 101 reads out a processing program stored in the storage 105, loads the program into the work area, and executes various processing including the processing on the smart watch 1 side, such as a map information display switch processing or a map information storage processing, and therefore functions as a position information acquiring member, a judging member, a display controlling member, an analyzing member, a partial map information acquiring member, a selecting member, or the like.

The operation input unit 102 includes push button switches 102A to 102C, a touch sensor provided on the display 104, and the like, and upon the acceptance of the input manipulation from the user, converts the manipulation content into electric signals and outputs the signals to the CPU 101. The operation input unit 102 has a voice input unit (not shown) formed of a microphone or the like, and the voice input by the user is converted into electric signals and output to the CPU 101.

The RAM 103 is volatile memory. The RAM 103 has a work area for storing various programs to be executed, data related to these various programs, and the like.

The display 104 is formed of a liquid crystal display (LCD), a cathode ray tube (CRT), or the like, and performs the screen display in accordance with a display control signal from the CPU 101. As described above, the touch sensor is provided on the display screen of the display 104.

The storage 105 is formed of, for example, a hard disk drive (HDD) having a magnetic recording medium. The storage 105 stores, for example, system programs or application programs such as processing programs and web server programs, to be executed in the CPU 101, and data necessary to execute these programs. The processing programs include programs to execute various processing typified by the processing on the smart watch 1 side, such as the map information display switch processing or the map information storage processing to be described below.

These programs are stored in the storage 105 in the program code format that can be read by the computer. The CPU 101 sequentially executes the operations in accordance with the program codes.

The storage 105 stores various kinds of data input by the user and various kinds of data transmitted from the smartphone 2. For example, the storage 105 can store, for example, the map information stored as the partial map information by the map information storage processing to be described below.

The communication unit 106 controls the communication of information with the external device, for example, a PC and the mobile device such as a smartphone connected through a predetermined wireless communication circuit (for example, wireless personal area network (PAN) such as Bluetooth (registered trademark)). The communication unit 106 is subjected to, for example, the communication setting called pairing in advance, and this setting enables to exchange device information or data of authentication key with a communication counterpart through wireless signals. This setting eliminates the necessity of performing the communication setting every time, and for example, if the smart watch 1 and the smartphone 2 are separated at a distance of such a degree that the radio waves do not reach, the communication connection is canceled and if they are placed close enough to receive the radio waves, the communication connection is automatically established.

The clock unit 107 includes, for example, a timer, a clock circuit, and the like, and acquires the time information by clocking the current time. The clock unit 107 outputs the acquired time information to the CPU 101.

The satellite radio wave receiving module 108 has an antenna, which is not shown, captures, receives, and demodulates the radio waves from a positioning satellite of a positioning system typified by Global Positioning System (GPS), and outputs the acquired current position information and time information to the CPU 101. The power supply to the satellite radio wave receiving module 108 can be controlled to be on or off individually on the basis of the user's manipulation independently of the power manipulation of the whole smart watch 1.

The output unit 109 includes a vibration motor generating vibration, a speaker, or the like, and outputs the vibration or voice on the basis of the signal transmitted from the CPU 101.

«Structure of Smartphone 2»

Next, the internal structure of the smartphone 2 is described. FIG. 3 illustrates the internal structure of the smartphone 2.

As illustrated in FIG. 3, the smartphone 2 includes a CPU 201, an operation input unit 202, RAM 203, a display 204, a storage 205, a communication unit 206, a clock unit 207, a satellite radio wave receiving module 208, and an output unit 209. These units are connected through a bus 210.

The CPU 201, the operation input unit 202, the RAM 203, the display 204, the storage 205, the communication unit 206, the clock unit 207, the satellite radio wave receiving module 208, and the output unit 209 have the structure similar to those of the CPU 101, the operation input unit 102, the RAM 103, the display 104, the storage 105, the communication unit 106, the clock unit 107, the satellite radio wave receiving module 108, and the output unit 109 of the smart watch 1, respectively. Here, the different part is mainly described.

The CPU 201 reads out a system program stored in the storage 205, loads the program into the work area of the RAM 203, and controls each unit in accordance with the system program. In addition, the CPU 201 reads out a processing program stored in the storage 205, loads the program into the work area, and executes various processing including the processing on the smartphone 2 side, such as a map information display switch processing or a map information storage processing to be described below.

The storage 205 is formed of, for example, a hard disk drive (HDD) having a magnetic recording medium. The storage 205 stores, for example, system programs or application programs such as processing programs and web browser programs, to be executed in the CPU 201, and data necessary to execute these programs. The processing programs include programs to execute various processes typified by the processing on the smartphone 2 side, such as the map information display switch processing or the map information storage processing to be described below.

The communication unit 206 communicates with the external device such as the paired smart watch 1 or the servers 3 and 4 on the communication network N, and exchanges data with the external device.

«Structure of Server 3 and Server 4»

The server 3 includes a browsing map information database (first external database) 31, and the server 4 includes a partial map information database (second external database) 41 and an area database 42. Here, the browsing map information is the map information that is, if the communication connection between a user terminal and the server 3 is established, displayed on a display screen of the user terminal and sequentially updated in response to the user's manipulation. The partial map information is the map information of a predetermined region which is downloaded from the server 4 and stored in the smart watch 1, and in which a predetermined piece of information (such as an icon or a memo) can be added in response to the user's manipulation, for example.

The area database 42 stores table data in which two-dimensional coordinate (latitude and longitude) information expressing the position of sectioning the area expressed by the map information, and the display mode of the map information in the area sectioned by the two-dimensional coordinate information are correlated to each other. In this table data, for example, the two-dimensional coordinate information and the display mode of the map information are correlated uniquely in a manner that: the display mode of the map information for the area A is "A" and the display mode of the map information for the area B is "B". When the partial map information is downloaded from the server 4, the area information expressing the area included in the partial map information and the display mode for the corresponding area is downloaded altogether.

Here, in the present invention, the display mode of the map information refers to the mode of the map information displayed on the screen depending on the difference in color, contrast, expressing method, creating method, contained information, or the like in regard to the map, and examples thereof are illustrated in FIGS. 4A to 4C. FIGS. 4A to 4C illustrate the examples of the map information displayed in the display 104 of the smart watch 1. FIG. 4A illustrates the map information expressed planarly, FIG. 4B illustrates the map information in which the geographic features are expressed with undulation, and FIG. 4C illustrates the map information based on the aerial photograph. Various buttons displayed with the map information in FIGS. 4A to 4C will be described below.

For example, if the current position is in the flat area, the map information in the display mode of FIG. 4A is suitable; if the current position is in the high area, the map information in the display mode of FIG. 4B or 4C is suitable. In this manner, the suitable display mode is different depending on the current position of the user.

«Operation of Map Information Display System 100»

Various processing performed by the map information display system 100 with the above structure will be described below. The various processing to be described below in the present embodiment are performed in the state that mutual data communication is possible between the smart watch 1 and the smartphone 2.

(Map Information Display Switch Processing)

Figure 5:
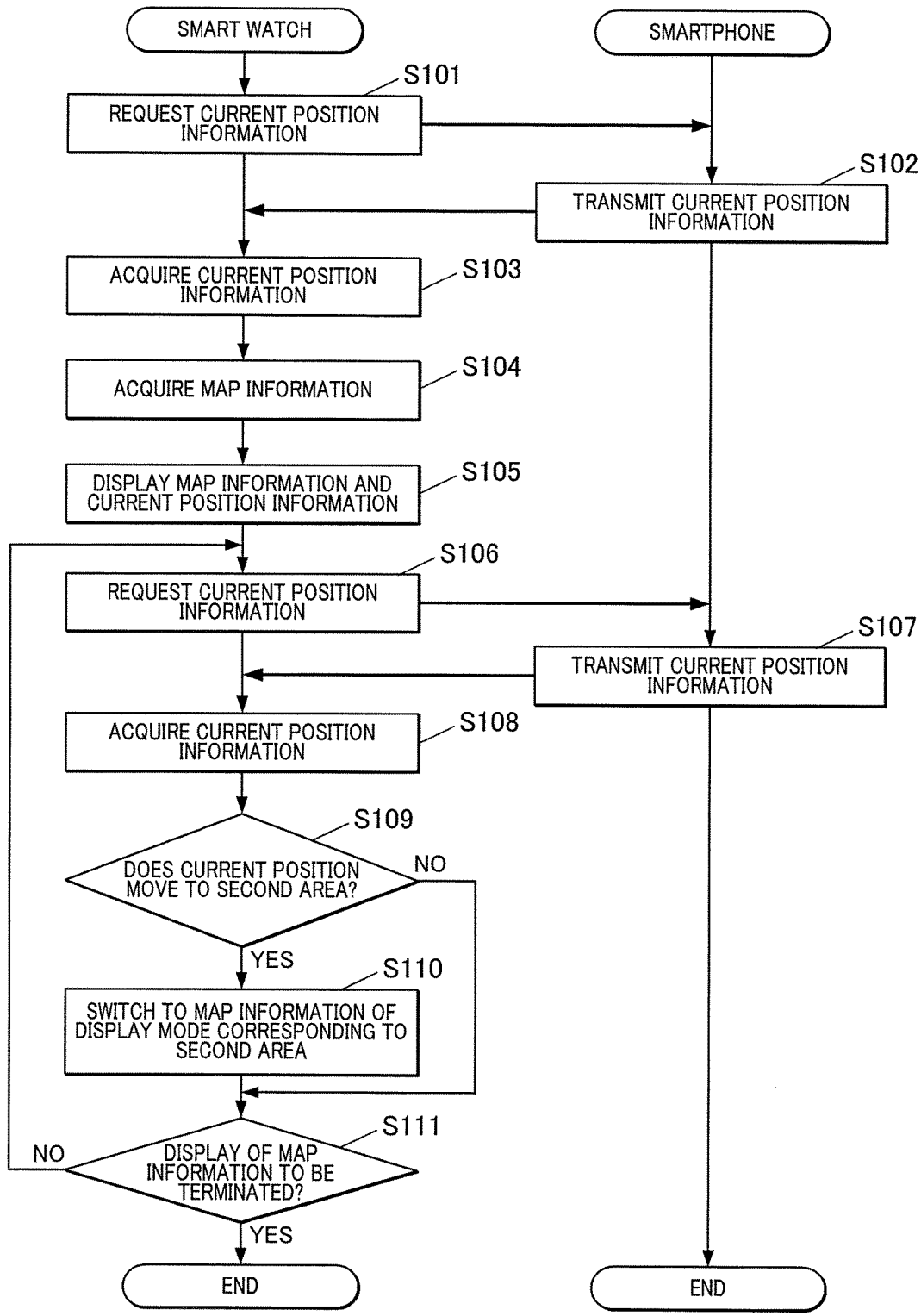
FIG. 5 is a flowchart illustrating one example of the map information display switch processing according to the embodiment.

First, the map information display switch processing performed by the map information display system 100 according to the present embodiment will be described with reference to FIG. 5, and FIGS. 6A and 6B. FIG. 5 is a flowchart illustrating one example of the map information display switch processing according to the present embodiment. FIGS. 6A and 6B illustrate examples of the screen displayed in the display 104 when the user browses the map information.

The map information display switch processing is performed when the user who wants to browse the map information has made a predetermined manipulation in the operation input unit 102 of the smart watch 1 at an arbitrary timing.

In addition, the display of the map information on the display 104 in the map information display switch processing is intended not to navigate the user to the destination set by the user like in the navigation terminal, for example, but to provide the user with the map information itself.

First, as illustrated in FIG. 5, the CPU 101 of the smart watch 1 requests the current position information from the smartphone 2 using the communication unit 106 (Step S101).

Next, the CPU 201 of the smartphone 2 acquires the current position information expressing the current position of the user using the satellite radio wave receiving module 208 and transmits the current position information to the smart watch 1 using the communication unit 206 (Step S102).

Next, the CPU 101 of the smart watch 1 acquires the current position information using the communication unit 106 (Step S103).

Next, the CPU 101 of the smart watch 1 acquires the map information from the storage 105 (Step S104). The map information to be acquired here is the map information stored in the storage 105 as the partial map information in the map information storage processing to be described below, and the map information in the display mode corresponding to the area where the current position expressed by the current position information exists. The display mode of the map information to be acquired is based on the area information stored in the storage 105 with the partial map information in the map information storage processing to be described below. If the map information in the corresponding display mode is not stored in the storage 105, the map information in the display mode employed when the map information is displayed previously may be acquired. Alternatively, the map information to be acquired here may be the map information in the display mode that is set in advance regardless of the current position.

Next, the CPU 101 causes the display 104 to display the acquired map information and the current position information (Step S105). Here, with reference to FIGS. 6A and 6B, description is made of the map information displayed in the display 104.

The display 104 displays a screen G6A illustrated in FIG. 6A, for example. The screen G6A displays the map in a predetermined distance range in which a current location pin P61 expressing the user's current position is the center. The screen G6A additionally displays a current location button P62, a zoom button P63, a memo kind button P64, a function drawer P65, and the like. The position of the current location pin P61 on the map information is determined based on the current position information acquired in Step S103.

If the user swipes the display 104 in a state that the screen G6A is displayed, the CPU 101 scrolls the map information in accordance with the swiped direction, and causes the display 104 to display the map information around the current location pin P61, for example, a screen G6B illustrated in FIG. 6B. If the user taps the current location button P62 in a state that the screen G6B is displayed, the CPU 101 causes the display 104 to display again the screen G6A in which the current location pin P61 is the center.

If the user taps the zoom button P63 or pushes the push button switch 102A in a state that the screen G6A or G6B or the like is displayed, the CPU 101 causes the display 104 to display a screen (not shown) in which the manipulation for magnifying or reducing the map information is possible.

If the user taps the memo kind button P64 or pushes the push button switch 102C in a state that the screen G6A or G6B or the like is displayed, the CPU 101 causes the display 104 to display a screen (not shown) in which the manipulation for adding an icon on the map information or leaving the memo information by, for example, inputting the voice on the map information is possible.

If the user taps the function drawer P65 or swipes the display 104 upward from the bottom in a state that the screen G6A or G6B or the like is displayed, the CPU 101 causes the display 104 to display a function drawer screen (not shown). The user can change various settings by performing a predetermined manipulation in a state that the function drawer screen is displayed.

If the user's manipulation is not input for a predetermined period in a state that the screen G6A or G6B or the like is displayed in the display 104, the CPU 101 may hide the current location button P62, the zoom button P63, the memo kind button P64, and the function drawer P65 from the display 104. These various buttons P62 to P65 may be hidden at the same time or sequentially hidden according to the lapse time. Instead of hiding the various buttons P62 to P65, the buttons may be made less visible; for example, the buttons may have lighter color.

First, as illustrated in FIG. 5, the CPU 101 of the smart watch 1 requests the current position information from the smartphone 2 using the communication unit 106 (Step S106).

Next, the CPU 201 of the smartphone 2 acquires the current position information expressing the current position of the user using the satellite radio wave receiving module 208 and transmits the current position information to the smart watch 1 using the communication unit 206 (Step S107).

Next, the CPU 101 of the smart watch 1 acquires the current position information using the communication unit 106 (Step S108). If the user has moved after the current position information is acquired previously and before the current position information is acquired this time, the current location pin P61 on the display 104 also moves to the position corresponding to the current position acquired this time and the map information is automatically scrolled so that the current location pin P61 comes to the central position of the display 104 and displayed again.

Next, the CPU 101 judges whether the current position expressed by the current position information acquired this time has moved from the first area to the second area (Step S109). Specifically, based on the map information and the area information, the CPU 101 judges whether the current position expressed by the current position information acquired this time has entered the second area different from the first area where the current position expressed by the current position information acquired previously exists.

If it is judged that the current position has moved from the first area to the second area (Yes in Step S109), the CPU 101 switches the map information displayed in the display 104 to the map information in the display mode corresponding to the second area where the current position expressed by the current position information exists without changing the scale (Step S110). That is to say, the CPU 101 acquires from the storage 105, the map information in the display mode for the second area where the current position exists on the basis of the area information stored in the storage 105, and causes the display 104 to display the acquired map information without changing the scale. Thus, the map information in the display mode suitable for the second area where the current position exists can be displayed easily in the display 104. Note that if the map information in the display mode suitable for the second area after the movement is not stored in the storage 105, the CPU 101 may not switch the map information displayed in the display 104 or may cause the display 104 to display a screen (not shown) to prompt the user to execute the map information storage processing to be described below.

If it is judged that the current position has not moved to the second area (No in Step S109), the CPU 101 skips the processing of Step S110 and performs the processing of Step S111.

Next, the CPU 101 judges whether to terminate the display of the map information on the basis of the user's manipulation (Step S111). Specifically, for example, if the push button switch 102B is pushed by the user in a state that the screen G6A or G6B illustrated in FIGS. 6A and 6B or the like is displayed, the CPU 101 judges to terminate the display of the map information.

If it is judged not to terminate the display of the map information (No in Step S111), the CPU 101 performs the processing of Step S106. That is to say, the CPU 101 requests the current position information from the smartphone 2 and acquires that information again.

If it is judged to terminate the display of the map information (Yes in Step S111), the CPU 101 terminates the map information display switch processing.

Although the map information is switched to the map information in the different display mode merely depending on whether the current position has moved from the first area to the second area in Step S110, the present invention is not limited to this procedure.

For example, the map information may be switched to the map information in the different display mode on the basis of the current time. More specifically, if the current position has moved to the downtown area (second area) and the current time is between 12:00 and 13:00, the map information may be switched to the map information in which the detailed shop information and the like are listed as the map information in the display mode for that area.

In another example, the map information may be switched to the map information in the different display mode on the basis of the information input by the user. More specifically, for example, if the current position has moved to the area (second area) such as in the mountain or in the highland and the smart watch 1 is executing the program for activity such as climbing, trekking, cycling, skiing, or snowboarding by the user's manipulation, the map information may be switched to the map information in the display mode for that area. In another example, if the current position has moved to the sea, river, or the like (second area) and the smart watch 1 is executing the program for activity such as fishing or surfing by the user's manipulation, the map information may be switched to the map information in the display mode for that area.

In still another example, the CPU 101 may function as the analyzing member that analyzes the user's action, and switch the map information to the map information in the different display mode on the basis of the analyzed user's action information. More specifically, the CPU 101 acquires any of various kinds of information such as the history of the current position, the moving distance, the moving speed, the date and time, the temperature, the humidity, the air pressure, the user's heart rate, and the change amount thereof, and based on the acquired information, the CPU 101 analyzes the user's action and acquires the action information expressing the user's action. Then, for example, if the current position has moved to the area (second area) such as in the mountain or in the highland and the user's action expressed by the action information is climbing, trekking, cycling, skiing, snowboarding, or the like, the map information may be switched to the map information in the display mode for that area. Alternatively, if the current position has moved to the sea, river, or the like (second area) and the user's action is fishing, surfing, or the like, the map information may be switched to the map information in the display mode for that area.

(Map Information Storage Processing)

Figure 8:
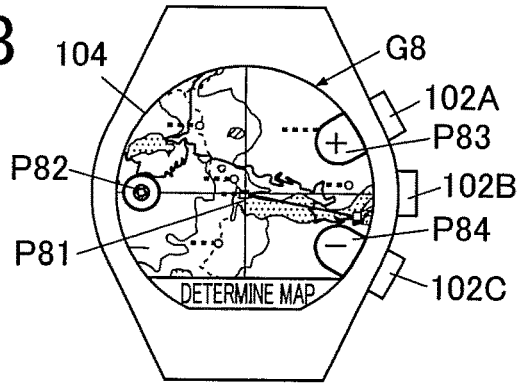
FIG. 8 illustrates one example of the screen displayed when the user determines the area to be downloaded.
Figure 9:
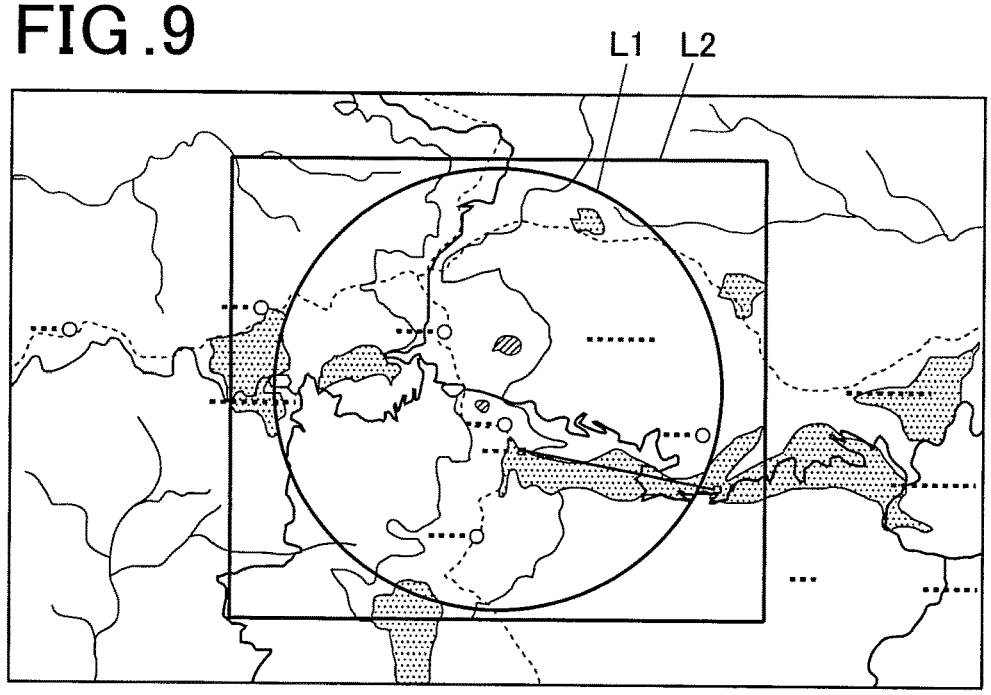
FIG. 9 illustrates the region displayed in the display and the region to be downloaded as the partial map information.

Subsequently, the map information storage processing performed by the map information display system 100 according to the present embodiment will be described with reference to FIG. 7 to FIG. 9. FIG. 7 is a flowchart illustrating one example of the map information storage processing according to the present embodiment. FIG. 8 illustrates one example of the screen displayed in the display 104 when the user sets the area to be downloaded. FIG. 9 illustrates the region displayed in the display 104 and the region downloaded as the partial map information.

The map information storage processing is the processing of downloading the map information displayed in the map information display switch processing through the smartphone 2 and storing the downloaded information in the storage 105 of the smart watch 1. The map information display switch processing is performed when the user who wants to store the map information to the smart watch 1 has made a predetermined manipulation in the operation input unit 102 of the smart watch 1 at an arbitrary timing. For example, the map information storage processing is preferably performed in advance if it is expected that the communication between the smart watch 1 and the smartphone 2 may be disconnected or the connection of the smartphone 2 to the communication network N may be lost.

As illustrated in FIG. 7, first, the CPU 101 judges whether the user has selected the display mode of the map information to download on the basis of the user's predetermined manipulation (Step S201). For example, the user can select the display mode of the map information that he or she wants to download from among a plurality of kinds of display modes of the map information including the examples illustrated in FIGS. 4A to 4C.

If it is judged that the display mode of the map information has not been selected (No in Step S201), the CPU 101 terminates the map information storage processing.

If it is judged that the display mode of the map information has been selected (Yes in Step S201), the CPU 101 requests the browsing map information from the smartphone 2 using the communication unit 106 (S202).

Next, the CPU 201 of the smartphone 2 establishes the communication connection with the server 3 through the communication network N using the communication unit 206, acquires the browsing map information from the browsing map information database 31 in the server 3, and transmits the acquired browsing map information to the smart watch 1 (Step S203). Here, it is preferable that, in addition to acquiring the browsing map information, the CPU 201 acquires the current position information expressing the current position of the user using the satellite radio wave receiving module 208 and based on the current position information, acquires the browsing map information in a predetermined distance range around the current position expressed by the current position information.

Next, the CPU 101 of the smart watch 1 acquires the browsing map information using the communication unit 106 (Step S204).

Next, the CPU 101 causes the display 104 to display the acquired browsing map information (Step S205). Here, description is made of the screen displayed in the display 104 with reference to FIG. 8.

The display 104 displays, for example, a screen G8 illustrated in FIG. 8. The screen G8 shows the browsing map information in which the user's current position is the center, and a cross mark P81 displayed on the browsing map information corresponds to the central position (current position). In addition, the current location button P82, a magnifying button P83, a reducing button P84, and a "set the map range" button P95 are displayed.

If the user swipes the display 104 in a state that the screen G8 is displayed, the CPU 101 scrolls the browsing map information in the swiped direction and moves the region displayed in the display 104 on the browsing map information. Thus, the browsing map information of the region whose central position is not the current position is displayed in the display 104 and this region can be set as the download range. In a state that the region whose central position is not the current position is displayed, if the user taps the current location button P82, the CPU 101 restores the region in the display 104 so that the current position comes to the center and causes the display 104 to display the screen G8 again.

If the user taps the magnifying button P83 or pushes the push button switch 102A, the CPU 101 causes the display 104 to display the screen (not shown) in which the map of the screen G8 is magnified at a predetermined ratio. Similarly, if the user taps the reducing button P84 or pushes the push button switch 102C, the CPU 101 causes the display 104 to display the screen (not shown) in which the map of the screen G8 is reduced at a predetermined ratio. Thus, the magnified or reduced region displayed in the display 104 can be set as the download range.

In this manner, the CPU 101 can specify an arbitrary region of the browsing map information by the user's manipulation and cause the display 104 to display the specified region.

As illustrated in FIG. 7, next, the CPU 101 judges whether the download range has been determined (Step S206). Specifically, for example, if the user taps the "set the map range" button P95 in a state that the screen G8 in FIG. 8 is displayed, the CPU 101 judges that the download range has been determined.

If it is judged that the download range has not been determined (No in Step S206), the CPU 101 terminates the map information storage processing.

If it is judged that the download range has been determined (Yes in Step S206), the CPU 101 requests the smartphone 2 to download the partial map information (Step S207). Specifically, the CPU 101 requests to download the partial map information of a region corresponding to the region of the browsing map information that is displayed in the entire screen of the display 104. For example, if the entire region displayed in the display 104 is a region L1 in FIG. 9, the CPU 101 sets a rectangular region L2 including the region L1 as the partial map information. In this manner, if the region larger than the region displayed in the display 104 is set as the download region, it is unnecessary to download the region again when the user tries to see a little outside of the region L1 on the map information acquired after the map information storage processing, and in this case, the user feels more convenient. The CPU 101 may set only the region of the browsing map information that is displayed in the entire screen of the display 104 as the download region or may set the region that is narrower than the region displayed in the entire screen of the display 104 by a predetermined area as the download region.

Next, the CPU 201 of the smartphone 2 establishes the communication connection with the server 4 through the communication network N using the communication unit 206, acquires the partial map information of the region L2 from the partial map information database 41 in the server 4, and transmits the acquired partial map information to the smart watch 1 (Step S208). Together with the partial map information, the CPU 201 downloads to obtain the area information expressing the area included in the partial map information and the display mode correlated to each area from the area database 42 in the server 4, and transmits the acquired area information to the smart watch 1.

Next, the CPU 101 of the smart watch 1 acquires the partial map information as the map information different from the browsing map information, using the communication unit 106, and acquires the area information (Step S209).

Next, the CPU 101 causes the storage 105 to store the acquired partial map information together with the area information (Step S210). Thus, the map information and the area information can be acquired from the storage 105 in the map information display switch processing.

The map information storage processing is performed as above.

In Step S201 described above, the display mode of the map information that the user downloads is selected based on the predetermined manipulation of the user, but the present invention is not limited to this procedure. For example, the map information in all the display modes that are downloadable may be downloaded collectively, and in this case, the processing of Step S201 may be omitted.

In another example, the processing of Step S201 may be performed after it is judged that the download range has been determined in the processing of Step S206. In this case, the CPU 101 may obtain the area information for the determined download range, and select any one of the map information in the display modes included in the area information.

In another example, the processing of Step S201 may be omitted. In this case, after it is judged that the download range has been determined in the processing of Step S206, the CPU 101 may obtain the area information for the determined download range, and based on the area information and for each area included in the download range, the CPU 101 may download the map information in the display mode for each area.

In Step S207 described above, the display 104 illustrated in FIG. 1 and the like is circular and the rectangular region L2 including the circular region L1 illustrated in FIG. 9 is the partial map information; however, the present invention is not limited to this structure. For example, the display 104 may be rectangular and the circular region including the entire region displayed in the display 104 may be the partial map information; alternatively, the display 104 may be circular or rectangular and the entire region displayed in the display 104 may be directly used as the partial map information. Further alternatively, the display 104 may have other shape than the circular or rectangular shape, and the partial map information may have any shape that suits the region corresponding to the entire region displayed in the display 104.

Although the CPU 201 of the smartphone 2 establishes the communication connection with the server 4 through the communication network N using the communication unit 206 and the partial map information is downloaded in Step S208 described above, the present invention is not limited to this procedure. In another example, the CPU 201 may judge whether the data communication with the server 4 through the wireless communication such as Wi-Fi (registered trademark) is possible, and if it is possible, may cause the display 104 to display the screen to switch to the Wi-Fi. If the Wi-Fi is enabled, the partial map information can be downloaded in a shorter time, and the convenience becomes higher.

(Other Operation)

Figure 10:
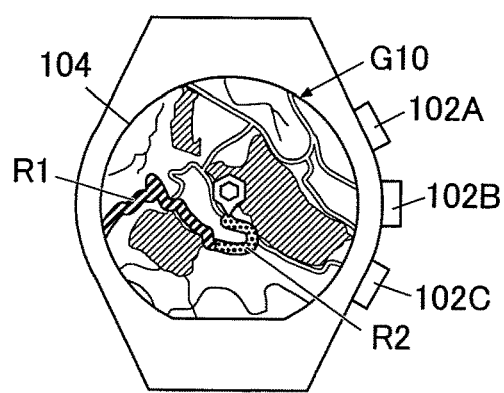
FIG. 10 illustrates one example of the screen displayed when the user browses the history of the current position information.

Other operation of the map information display system 100 according to the present embodiment will be described with reference to FIG. 10. FIG. 10 illustrates one example of the screen displayed when the user browses the history of the current position information.

The smart watch 1 has a function of displaying the history of the user's current position.

For example, when the user performs a predetermined manipulation in a state that the function drawer screen is displayed in the display 104 of the smart watch 1, the user can set whether to record his daily current position information as the history in the storage 105. If the history recording is enabled and the user has moved a predetermined distance, the user's predetermined manipulation on the function drawer screen allows the CPU 101 to display a history screen G10 of the current position information illustrated in FIG. 10 in the display 104. The history screen G10 shows, for example, lines R1 and R2 expressing the history of the current position of the user on the map information. The line R1 shows the history of the current position when the CPU 101 executes the program for activity such as trekking, cycling, skiing, snowboarding, fishing, or surfing, and the line R2 shows the history of the current position when the CPU 101 does not execute that program. This enables the user to check the history of the current position and feel more convenient.

«Technical Effect of the Present Embodiment»

According to the present embodiment, the smart watch 1 includes: the display 104 that displays a predetermined map information group having map information in a display mode for a first area and map information in a display mode for a second area; and the CPU 101 that acquires current position information and when the current position expressed by the current position information is included in the first area, causes the display 104 to display the map information in the display mode for the first area without guiding the user to the destination, and when the current position is included in the second area, causes the display 104 to display the map information in the display mode for the second area without guiding the user to the destination. Therefore, the map information in the display mode suitable for each area can be acquired.

The display 104 displays any one of a plurality of pieces of map information with the different display modes for the area, and the CPU 101 judges whether the current position has moved from the first area to the second area. If it is judged that the current position has moved from the first area to the second area, the map information displayed in the display 104 is switched to the map information in the display mode for the second area where the current position exists. Thus, the map information in the display mode suitable for the current position can be acquired.

Moreover, on the basis of an additional condition, which is different from the condition as to whether the current position has moved from the first area to the second area, the CPU 101 switches the map information displayed in the display 104 to the map information in the display mode for the second area where the current position exists. Therefore, the map information in the display mode suitable for the user's current circumstance can be acquired.

The additional condition is based on the time information, the information input by the user, or the user's action information analyzed by the analyzing member; therefore, the map information in the display mode that is more suitable for the user's current circumstance can be acquired.

According to the present embodiment, the smart watch 1 includes: the display 104 that displays information; the CPU 101 that causes the display 104 to display the arbitrary region of the browsing map information specified by the user's manipulation and acquires the partial map information of a region corresponding to the region of the browsing map information that is displayed in the entire screen of the display 104 as the map information different from the browsing map information; and the storage 105 that stores the partial map information acquired by the CPU 101. Therefore, only the map information of the necessary region can be stored easily. In addition, since the map information to be stored is different from the browsing map information, the map information can be selected with higher degree of freedom and the user causes the storage 105 to store the desired kind of map information.

The CPU 101 magnifies or reduces the region of the browsing map information that is displayed in the display 104, and acquires the partial map information of the region corresponding to the magnified or reduced region that is displayed in the entire screen of the display 104; therefore, the map information of the necessary region can be specified more accurately.

The CPU 101 moves, on the browsing map information, the region of the browsing map information that is displayed in the display 104, and acquires the partial map information of the region corresponding to the moved region that is displayed in the entire screen of the display 104; therefore, the map information of the necessary region can be specified more easily.

The CPU 101 acquires the browsing map information from the browsing map information database 31, causes the display 104 to display the acquired information, and acquires the partial map information from the partial map information database 41. Therefore, even in the case where the browsing map information and the partial map information are acquired from the different eternal databases, only the map information of the necessary region can be stored easily.

The CPU 101 selects the display mode of the map information by the user's manipulation and acquires the partial map information in the selected display mode; thus, the map information in the desired display mode can be stored.

The CPU 101 acquires the rectangular partial map information of the region corresponding to the entire region displayed in the display 104. Therefore, when the display 104 is circular, the region larger than the display 104 can be stored as the partial map information.

The CPU 101 causes the display 104 to display the partial map information stored in the storage 105. Therefore, the stored map information can be browsed by the user easily and the convenience can be improved.

«Modification»

A modification of the map information display system 100 according to the above embodiment will be described. The modification of the map information display system 100 has the structure similar to that of the map information display system 100 according to the above embodiment except the point to be described below.

The map information display system according to the modification is different from the map information display system 100 according to the above embodiment in the following point. That is, the map information display system according to the modification does not include the smartphone 2 and includes the smart watch 1, the server 3, and the server 4. The smart watch 1 can exchange data by communicating with the external device such as the servers 3 and 4 using the communication unit 106 without using the smartphone or the like. Therefore, the map information display system according to the modification performs the various processing, which are performed by the map information display system 100 according to the above embodiment, by the smart watch 1 alone. Therefore, the user only needs to have the smart watch 1 and the data communication between the smart watch 1 and the smartphone 2 may be unnecessary.

For example, the map information display system according to the modification, that is, the smart watch 1 performs the map information display switch processing and the map information storage processing in the following manner.

(Map Information Display Switch Processing)

Figure 11:
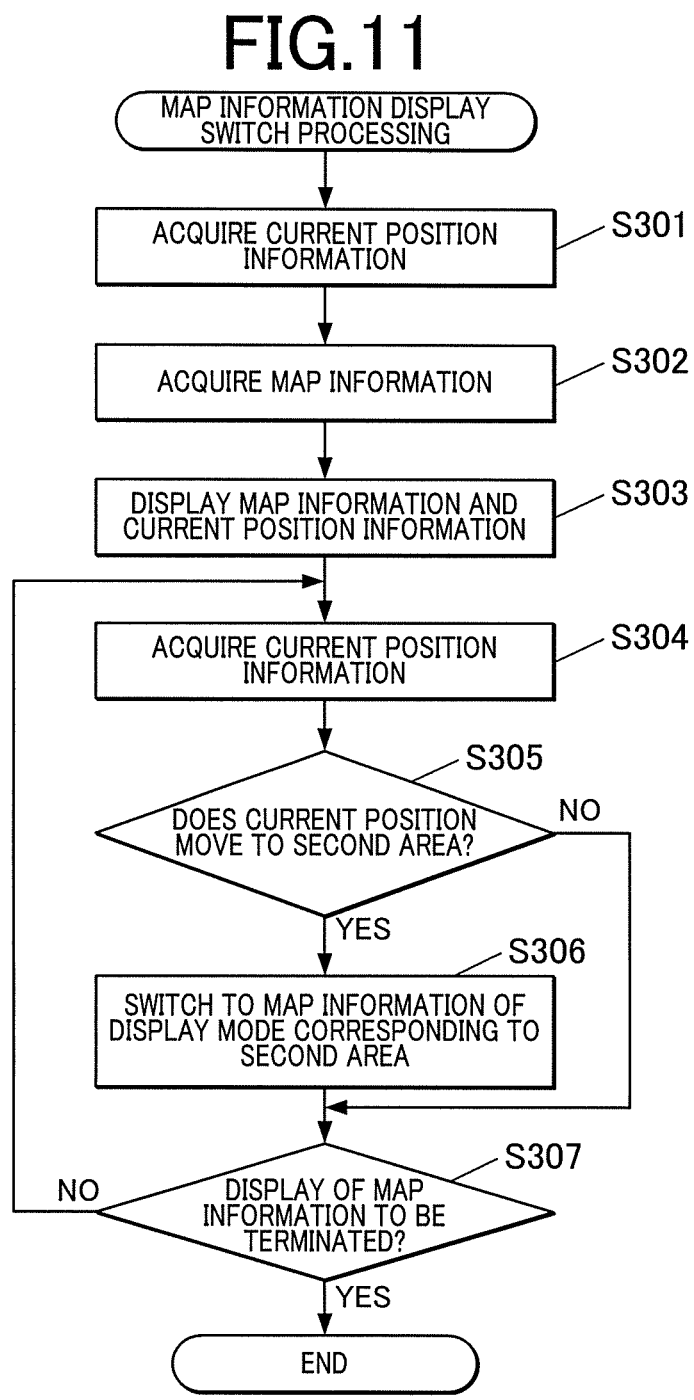
FIG. 11 is a flowchart illustrating one example of the map information display switch processing according to a modification.

First, the map information display switch processing according to the modification is described with reference to FIG. 11. FIG. 11 is a flowchart illustrating one example of the map information display switch processing according to the modification.

The map information display switch processing is performed when the user who wants to browse the map information has made a predetermined manipulation in the operation input unit 102 of the smart watch 1 at an arbitrary timing.

First, as illustrated in FIG. 11, the CPU 101 of the smart watch 1 acquires the current position information expressing the current position of the user using the satellite radio wave receiving module 108 (Step S301).

Next, the CPU 101 acquires the map information from the storage 105 (Step S302). The map information to be acquired here is the map information stored in the storage 105 as the partial map information in the map information storage processing to be described below, and is also the map information in the display mode corresponding to the area where the current position expressed by the current position information exists. The display mode of the map information to be acquired is based on the area information stored in the storage 105 with the partial map information in the map information storage processing to be described below.

Next, the CPU 101 displays the acquired map information and current position information in the display 104 (Step S303).

Next, the CPU 101 acquires the current position information expressing the current position of the user using the satellite radio wave receiving module 108 (Step S304).

Next, the CPU 101 judges whether the current position expressed by the current position information acquired this time has moved from the first area to the second area (Step S305). Specifically, based on the map information and the area information, the CPU 101 judges whether the current position expressed by the current position information acquired this time has entered the second area that is different from the first area where the current position expressed by the current position information acquired previously exists.

If it is judged that the current position has moved to the second area (Yes in Step S305), the CPU 101 switches the map information displayed in the display 104 to the map information in the display mode for the area where the current position expressed by the current position information exists without changing the scale (Step S306).

If it is judged that the current position has not moved to the second area (No in Step S305), the CPU 101 skips the processing of Step S306 and performs the processing of Step S307.

Next, the CPU 101 judges whether to terminate the display of the map information on the basis of the user's manipulation (Step S307).

If it is judged not to terminate the display of the map information (No in Step S307), the CPU 101 performs the processing of Step S304.

If it is judged to terminate the display of the map information (Yes in Step S307), the CPU 101 terminates the map information display switch processing.

(Map Information Storage Processing)

Figure 12:
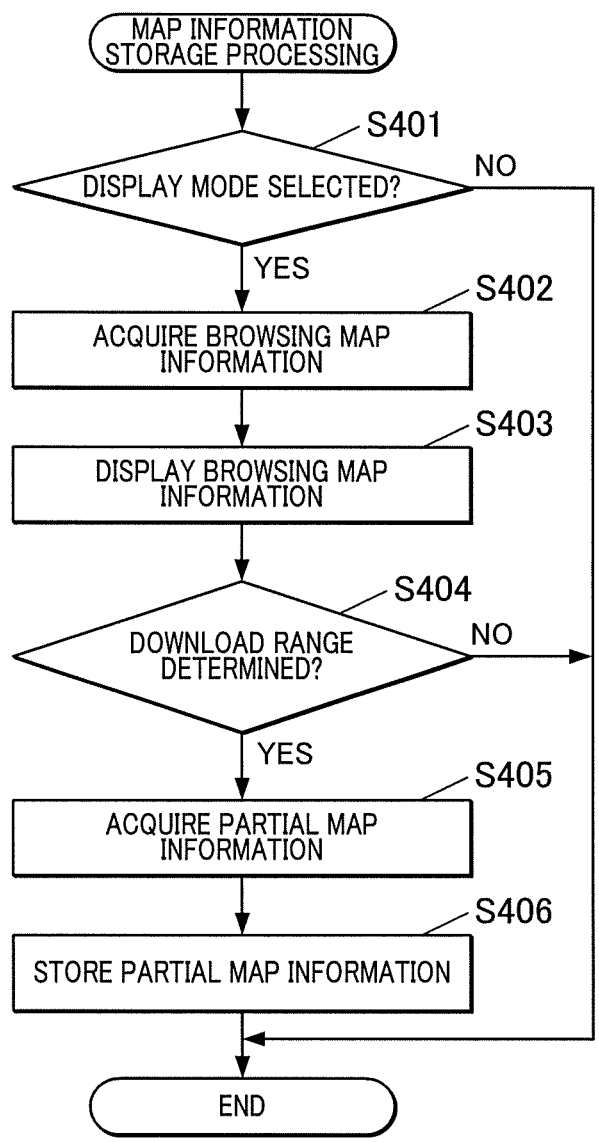
FIG. 12 is a flowchart illustrating one example of the map information storage processing according to the modification.

Subsequently, the map information storage processing according to the modification will be described with reference to FIG. 12. FIG. 12 is a flowchart illustrating one example of the map information storage processing according to the modification.

The map information display storage processing is performed when the user who wants to cause the smart watch 1 to store the map information has made a predetermined manipulation in the operation input unit 102 of the smart watch 1 at an arbitrary timing. For example, the map information storage processing is preferably performed in advance if it is expected that the connection of the smart watch 1 to the communication network N may be lost.

As illustrated in FIG. 12, first, the CPU 101 judges whether the user has selected the display mode of the map information to download, on the basis of the user's predetermined manipulation (Step S401).

If it is judged that the display mode of the map information has not been selected (No in Step S401), the CPU 101 terminates the map information storage processing.

If it is judged that the display mode of the map information has been selected (Yes in Step S401), the CPU 101 establishes the communication connection with the server 3 through the communication network N using the communication unit 106, and acquires the browsing map information from the browsing map information database 31 in the server 3 (Step S402).

Next, the CPU 101 causes the display 104 to display the acquired browsing map information (Step S403).

Next, the CPU 101 judges whether the download range has been determined (Step S404).

If it is judged that the download range has not been determined (No in Step S404), the CPU 101 terminates the map information storage processing.

If it is judged that the download range has been determined (Yes in Step S404), the CPU 101 downloads the partial map information (Step S405). That is, the CPU 101 establishes the communication connection with the server 4 through the communication network N using the communication unit 106, and downloads to obtain the partial map information from the partial map information database 41 in the server 4. Together with the partial map information, the CPU 101 downloads to obtain the area information expressing the area included in the partial map information and the display mode for that area from the area database 42 in the server 4.

Next, the CPU 101 causes the storage 105 to store the acquired partial map information together with the area information (Step S406).

The map information storage processing is performed in the above-described manner.

(Technical Effect of Modification)

As described above, since the map information display system according to the modification does not include the smartphone, in addition to the technical effect acquired in the embodiment, another advantage is acquired that the user does not need to carry the smartphone. Thus, the user feels very convenient.

《Other》

The description of the embodiment and the modification as above is just one example of the preferable map information display system according to the present invention, and the present invention is not limited by the above description. In particular, various images displayed in the display 104 of the smart watch 1 are just examples and the images are not limited to the displayed ones.

For example, the map information display system includes the smart watch 1, the server 3, and the server 4 in the above modification but the components of the map information display system are not limited to these. That is, the smart watch 1 may be omitted from the map information display system, and just the smartphone 2, the server 3, and the server 4 may be included. In this case, the various processing such as the map information display switch processing and the map information storage processing as described above are performed by the smartphone 2 alone.

In the above embodiment, the time of each cycle of the processing in Steps S106 to S111 in the map information display switch processing is not restricted to the particular time; however, the time may be restricted in the present invention. For example, the CPU 101 may change the setting so that the current position information is acquired for every one second, five seconds, or sixty seconds, for example, based on the user's manipulation. By restricting this time to be short, the accuracy of the current position can be improved and by restricting this time to be long, the power consumption of the battery of the smart watch 1 can be suppressed. In another example, if the user is executing the program for the activity such as climbing, trekking, cycling, skiing, snowboarding, fishing, or surfing, the CPU 101 of the smart watch 1 may restrict the time in accordance with the kind of activity.

The above embodiment has described the so-called automatic switching mode: when the current position is included in the first area, the map information in the display mode corresponding to the first area is displayed in the display 104 and when the current position is included in the second area, the map information in the display mode corresponding to the second area is displayed in the display 104. However, the mode in the present invention is not limited to the above-described one. For example, in addition to the automatic switching mode, the CPU 101 may employ the manual switching mode in which the display of the map information in the display mode for the first area and the display of the map information in the display mode for the second area are switched by the manual manipulation of the user. In the manual switching mode, the map information may be switched only to the map information in the display mode stored in the storage 105 in advance, or if the manipulation is performed to switch the map information to the map information in the display mode other than the display mode stored in the storage 105, the screen (not shown) to prompt the user to perform the map information storage processing may be displayed in the display 104. In another example, the automatic switching mode and the manual switching mode may be switched as appropriate upon request by the user's setting manipulation. In still another example, in the state that the automatic switching mode is set, the display of the map information in the display mode for the first area and the display of the map information in the display mode for the second area may be switched as appropriate by the manual manipulation by the user.

In the above embodiment and modification, when the current position has moved from the first area to the second area, the map information is switched to the map information in the display mode for the second area where the current position exists; however, the present invention is not limited to this procedure.

For example, the CPU 101 may cause the display 104 to display the composite map information in which the map information in the display mode for the first area and the map information in the display mode for the second area are combined. Specifically, the CPU 101 may generate the composite map information displayed in the display modes for the respective areas on the basis of the area database 42 in the server 4, and cause the display 104 to display the generated composite map information. Here, the composite map information is the map information in which a plurality of pieces of map information in the display modes for the respective areas is combined and which is displayed in the display modes different depending on the areas. Thus, the map information in the display modes suitable for the respective areas can be acquired. In this case, when the current position has moved from the first area to the second area, the composite map information may be constantly provided to the user without switching the map information to the map information in the display mode for the second area where the current position exists. Therefore, the timing when the composite map information is displayed may be, for example, when the map information is displayed in the display 104 (for example, the timing of Step S105 of the map information display switch processing illustrated in FIG. 5) or when the map information is switched because the current position has moved from the first area to the second area (for example, the timing of Step S110 of the map information display switch processing illustrated in FIG. 5). After the composite map information is displayed in the display 104, the map information is not necessarily switched to the map information in another display mode.

The CPU 101 may determine the display mode of the map information for each area on the basis of a predetermined condition, for example, the time information or the information input by the user, and generate the composite map information on the basis of the determined display modes. Specifically, for example, if the time information expressing the time when the composite map information is generated or the time information input by the user's manipulation indicates the time band in a predetermined range, the display modes of the map information may be selected in accordance with that time band and determined for the respective areas, and based on this determined display modes, the composite map information may be generated. In another example, when the CPU 101 is executing the program for the activity such as climbing, trekking, cycling, skiing, snowboarding, fishing, or surfing by the user's manipulation, the display modes of the map information may be selected in accordance with the kind of activity and determined for the respective areas, and based on this determined display modes, the composite map information may be generated. In this case, the composite map information that is more suitable for the user's current circumstance can be generated and the user can feel more convenient.

The CPU 101 may generate the composite map information when, for example, the user has selected to obtain the composite map information. In this case, for example, after the download region is set just like in Steps S202 to S206 in the aforementioned map information storage processing, the display mode of the map information is determined for each area included in the download region and the map information for the corresponding display mode may be acquired for each area included in the download region.

Alternatively, the composite map information may be stored in the storage 105 in advance and the CPU 101 may obtain the composite map information from the storage 105 and display the acquired composite map information.

In the embodiment and modification described above, the CPU 101 acquires the map information from the storage 105 and display the acquired map information (for example, Steps S104 and S105 in the map information display switch processing illustrated in FIG. 5) but the present invention is not limited to this procedure. For example, the CPU 101 may request the browsing map information from the smartphone 2, obtain the browsing map information, and cause the display 104 to display the acquired information. That is to say, the CPU 101 may request and obtain the browsing map information in response to the user's manipulation not just in the map information storage processing and causes the display 104 to display the acquired information. In another example, if the map information can be acquired from the storage 105 and the browsing map information can also be acquired from the smartphone 2, the CPU 101 may obtain the map information from the storage 105. This can improve the display speed of the map information in the display 104 or the responsiveness by the user's manipulation as compared to acquiring the browsing map information from the smartphone 2 and displaying the acquired information. In addition, the power consumption due to the communication with the smartphone 2 can be suppressed.

In the above embodiment and modification described above, the CPU 101 or the CPU 201 acquires the browsing map information from the browsing map information database 31 and acquires the partial map information from the partial map information database 41, but the present invention is not limited to this procedure. For example, the CPU 101 or the CPU 201 may obtain the browsing map information and the partial map information from the same external database.

In the above embodiment and modification, the CPU 101 causes the display 104 to display the partial map information stored in the storage 105 but the present invention is not limited to this procedure. For example, the CPU 101 may cause the display 204 of the smartphone 2 or another display device to display the partial map information.

In the above embodiment and modification, the CPU 201 of the smartphone 2 acquires the current position information expressing the current position of the user using the satellite radio wave receiving module 208 or the CPU 101 of the smart watch 1 acquires the current position information expressing the current position of the user by the satellite radio wave receiving module 108. However, the present invention is not limited to this procedure and, for example, the current position information may be acquired by using the network position information such as the indoor location technology.

In the above embodiment, the computer readable medium for the programs according to the present invention is a hard disk, semiconductor nonvolatile memory, or the like but the present invention is not limited to these examples. Other examples of the computer readable medium include a potable recording medium such as a CD-ROM. A medium that provides the data of the programs through the communication line according to the present invention may be a carrier wave.

Some examples of the present invention have been described so far; however, the scope of the present invention is not limited to the examples described above, and includes the range of the invention described in the scope of claims and its equivalent range.

What is claimed is:
1. A map display device comprising:
    a display which displays a predetermined map information group including first map information in a first display mode correlated to a first area and second map information in a second display mode correlated to a second area; and
    a processor which conducts the functions of:
        acquiring current position information,
        determining in which of the first area and the second area the current position indicated by the current position information is located, and
        causing the display to perform a display of the first map information in the first display mode correlated to the first area without guiding a user to a destination when it is determined that the current position indicated by the current position information is located in the first area, and causing the display to perform a display of the second map information in the second display mode correlated to the second area without guiding the user to the destination when it is determined that the current position is located in the second area.

2. The map display device according to claim 1, wherein the causing involves causing the display to display the first map information in the first display mode correlated to the first area when the current position is located in the first area, and causing the display to display the second map information in the second display mode correlated to the second area without changing a scale from the first map information in the first display mode correlated to the first area when the current position is located in the second area.

3. The map display device according to claim 1, wherein the processor further conducts the function of:
    judging whether the current position has moved from the first area to the second area, and
    the display displays any one of a plurality of pieces of map information in different display modes correlated to a plurality of areas, and
    the causing involves switching the map information displayed in the display to the second map information in the second display mode correlated to the second area where the current position is located, when the judging judges that the current position has moved from the first area to the second area.

4. The map display device according to claim 3, wherein the causing involves switching the map information displayed in the display to the second map information in the second display mode correlated to the second area where the current position is located, based on an additional condition different from a condition on whether the current position has moved from the first area to the second area.

5. The map display device according to claim 4, wherein the additional condition is time information, information input by a user, or user action information analyzed by the processor.

6. The map display device according to claim 1, wherein the causing involves an automatic switch mode and a manual switch mode,
    in the automatic switch mode, the causing involves causing the display to display the first map information in the first display mode correlated to the first area without guiding the user to the destination when the current position is located in the first area, and causing the display to display the second map information in the second display mode correlated to the second area without guiding the user to the destination when the current position is located in the second area, and
    in the manual switch mode, the display of the first map information in the first display mode correlated to the first area and the display of the second map information in the second display mode correlated to the second area are switched to each other by a user manual operation.

7. The map display device according to claim 1, wherein the display displays composite map information where the first map information in the first display mode correlated to the first area and the second map information in the second display mode correlated to the second area are combined with each other, and
    the causing involves causing the display to display the composite map information.

8. The map display device according to claim 7, wherein the processor further conducts the function of:
    determining a display mode of map information for each area based on a predetermined condition to generate the composite map information.

9. The map display device according to claim 8, wherein the predetermined condition is time information or information input by a user.

10. A non-transitory computer readable storage medium storing a program executable by a computer, the program causing the computer which controls an apparatus equipped with a display displaying a predetermined map information group including first map information in a first display mode correlated to a first area and second map information in a second display mode correlated to a second area, to conduct the functions of:

acquiring current position information, determining in which of the first area and the second area the current position indicated by the current position information is located, and causing the display to perform a display of the first map information in the first display mode correlated to the first area without guiding a user to a destination when it is determined that the current position indicated by the current position information is located in the first area, and causing the display to perform a display of the second map information in the second display mode correlated to the second area without guiding the user to the destination when it is determined that the current position is located in the second area.

11. A map display method comprising:

acquiring current position information, determining in which of a first area and a second area the current position indicated by the current position information is located, and causing a display to perform a display of first map information in a first display mode correlated to the first area without guiding a user to a destination when it is determined that the current position indicated by the current position information is located in the first area, and causing the display to perform a display of second map information in a second display mode correlated to the second area without guiding the user to the destination when it is determined that the current position is located in the second area.

12. The map display method according to claim 11, wherein the causing involves causing the display to display the first map information in the first display mode correlated to the first area when the current position is located in the first area, and causing the display to display the second map information in the second display mode correlated to the second area without changing a scale from the first map information in the first display mode correlated to the first area when the current position is located in the second area.

13. The map display method according to claim 11, further comprising:

judging whether the current position has moved from the first area to the second area, wherein the display displays any one of a plurality of pieces of map information in different display modes correlated to a plurality of areas, and the causing involves switching the map information displayed in the display to the second map information in the second display mode correlated to the second area where the current position is located, when the judging judges that the current position has moved from the first area to the second area.

14. The map display method according to claim 13, wherein the causing involves switching the map information displayed in the display to the second map information in the second display mode correlated to the second area where the current position is located, based on an additional condition different from a condition on whether the current position has moved from the first area to the second area.

15. The map display method according to claim 14, wherein the additional condition is time information, information input by a user, or analyzed user action information.

16. The map display method according to claim 11, wherein the causing involves an automatic switch mode and a manual switch mode, in the automatic switch mode, the causing involves causing the display to display the first map information in the first display mode correlated to the first area without guiding the user to the destination when the current position is located in the first area, and causing the display to display the second map information in the second display mode correlated to the second area without guiding the user to the destination when the current position is located in the second area, and in the manual switch mode, the display of the first map information in the first display mode correlated to the first area and the display of the second map information in the second display mode correlated to the second area are switched to each other by a user manual operation.

17. The map display method according to claim 11, wherein the display displays composite map information where the first map information in the first display mode correlated to the first area and the second map information in the second display mode correlated to the second area are combined with each other, and the causing involves causing the display to display the composite map information.

18. The map display method according to claim 17, further comprising:

determining a display mode of map information for each area based on a predetermined condition to generate the composite map information.

19. The map display method according to claim 18, wherein the predetermined condition is time information or information input by a user.

* * * * *